Figure 5:
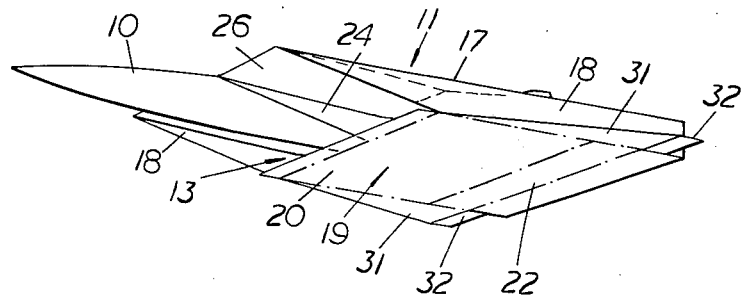

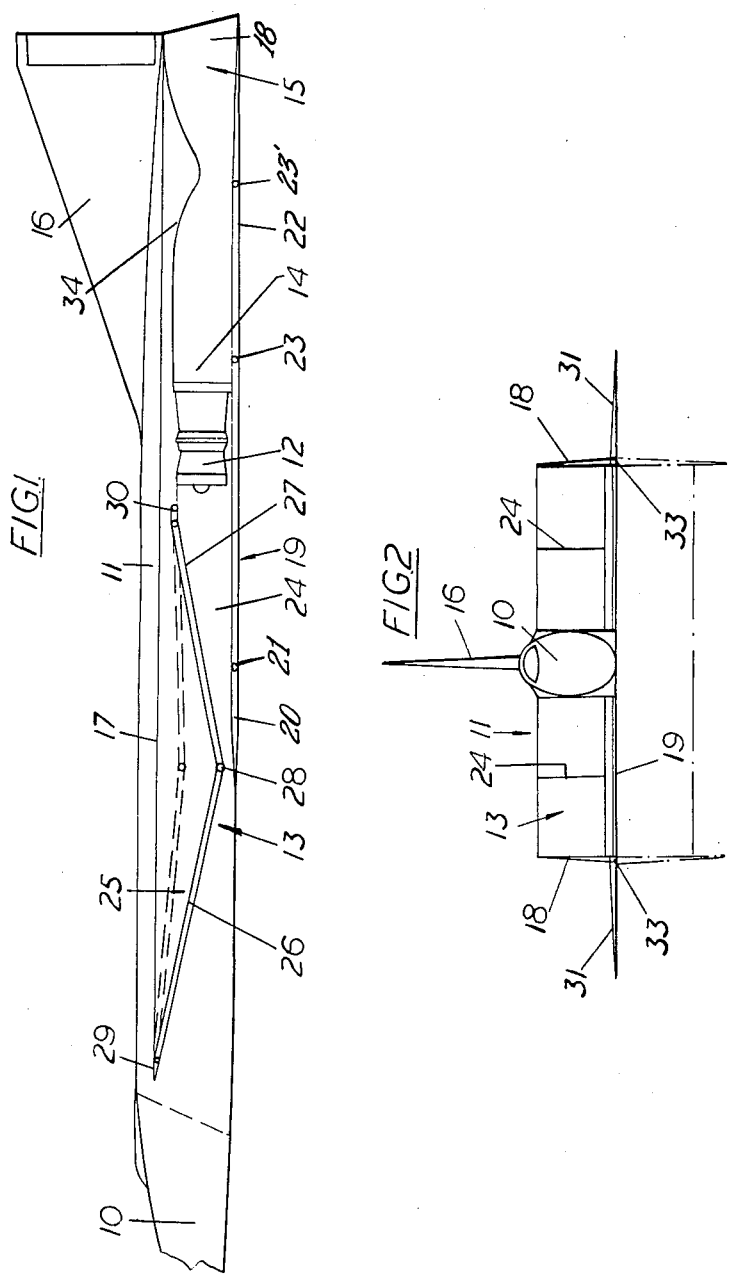

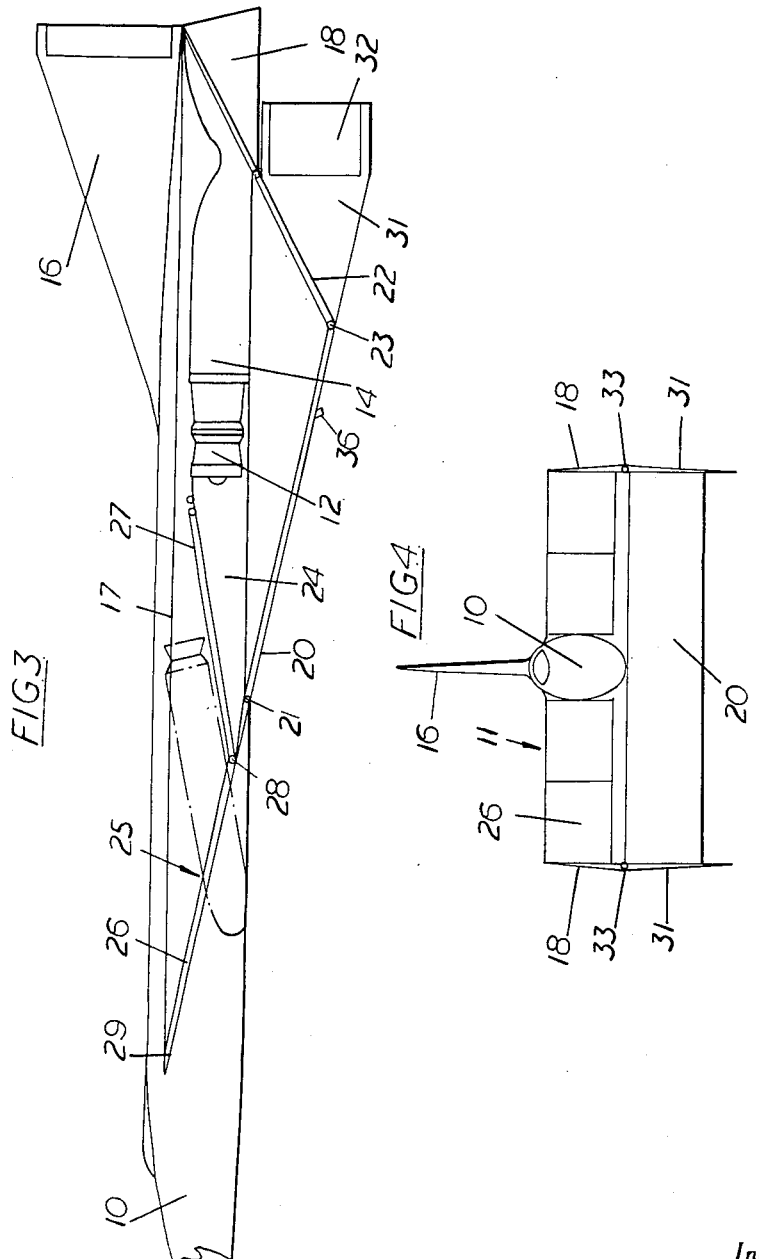

Oct. 19, 1965   J. G. KEENAN   3,212,734
HIGH SPEED AIRCRAFT
Filed March 17, 1964   4 Sheets-Sheet 3

Inventor
JOHN GREGORY KEENAN

By Cushman, Darby & Cushman
Attorneys

Oct. 19, 1965  J. G. KEENAN  3,212,734
HIGH SPEED AIRCRAFT
Filed March 17, 1964  4 Sheets-Sheet 4

Inventor
JOHN GREGORY KEENAN
By
Cushman, Darby & Cushman
Attorneys

United States Patent Office 3,212,734
Patented Oct. 19, 1965

3,212,734
HIGH SPEED AIRCRAFT
John Gregory Keenan, Shelton Lock, Derby, England,
assignor to Rolls-Royce Limited, Derby, England
Filed Mar. 17, 1964, Ser. No. 352,503
Claims priority, application Great Britain, Apr. 20, 1963,
15,657/63
15 Claims. (Cl. 244—53)

This invention relates to high speed aircraft and in particular to an aircraft having variable configurations to suit varying flight speeds.

According to the present invention there is provided an aircraft having one or more forward propulsion engines, which aircraft is adapted so that its configuration can be altered to a wedge-shaped configuration, the air-intake and the propulsion nozzle of the or each forward propulsion engine being closed when said aircraft is altered to said wedge-shaped configuration, means being provided for supplying fuel in such a position that it will burn on or adjacent the external surface of the rear wall of the wedge-shaped aircraft, said fuel being burned with atmospheric air in the region of said rear surface so as to produce a forward thrust on said wedge-shaped aircraft.

Preferably the said one or more forward propulsion engines are disposed internally of the aircraft, the or each air intake having a wall portion which can be adjusted so as to vary the cross-sectional area of the intake to suit subsonic and supersonic flight conditions, and can also be adjusted to close completely the air intake, the propulsion nozzle or nozzles having a wall adapted to be adjusted to close off the nozzle or nozzles.

The or each air intake may be rectangular in cross-section and have an upper wall portion which is adjustable, the or each nozzle also being of rectangular cross-section and having a lower wall portion which is adjustable.

The upper wall of the or each air intake may comprise a flat wall member pivoted in the region of its upstream end, the lower wall of the or each air intake comprising a flat wall which forms the, or a portion of the, lower surface of the aircraft, said lower wall being adapted to pivot in the region of its upstream end so as to form a continuation of said upper wall when said upper wall is moved to the position in which it closes off the air intake, said upper and lower walls forming in this position a continuous lower wall of the aircraft which diverges from the upper wall surface of the aircraft, the lower wall of said propulsion nozzle or nozzles being pivoted in the region of its mid-length to form an end wall of the aircraft which extends from the downstream end of the lower wall to the downstream end of the upper surface of the aircraft, said walls and fixed aircraft surfaces forming in this position the wedge-shaped configuration.

The flat wall member of the or each air-intake may be hinged at its downstream end to a flat wall member which is slidably mounted at its downstream end and diverges from the lower wall of the air intake in a downstream direction.

Preferably the lower wall of the or each air intake has its downstream end hinged to the upstream end of the lower wall of the propulsion nozzle, the pivot connection of the upstream end of the lower wall of the or each air intake being slidably mounted, the said lower walls of the intake and propulsion nozzle forming a flat lower surface of the aircraft which is substantially parallel to the flat upper surface of the aircraft when the forward propulsion engine or engines are operative.

The aircraft may be provided with wing portions which are pivoted and are adapted to be swung to a position in which they form part of the flat side walls of the wedge-shape configuration.

The or each forward propulsion engine may be a gas turbine engine, a rocket motor, a ram jet engine or a turbo-ramjet engine of the type disclosed and claimed in co-pending United States patent application Serial No. 328,659.

The fuel supplied to the external surface of the rear wall of the wedge-shaped aircraft may be from a nozzle or nozzles situated in the region of the rear end of the lower divergent wall of the wedge.

The fuel may be a selfignitable fuel such as for example hydrogen.

The term wedge-shaped aircraft is to be understood as meaning an aircraft whose upper and lower surfaces diverge in a direction towards the rear end of the aircraft and terminate in a flat surface which extends from the rear end of the upper surface to the rear end of the lower surface of the aircraft.

Figure 6:
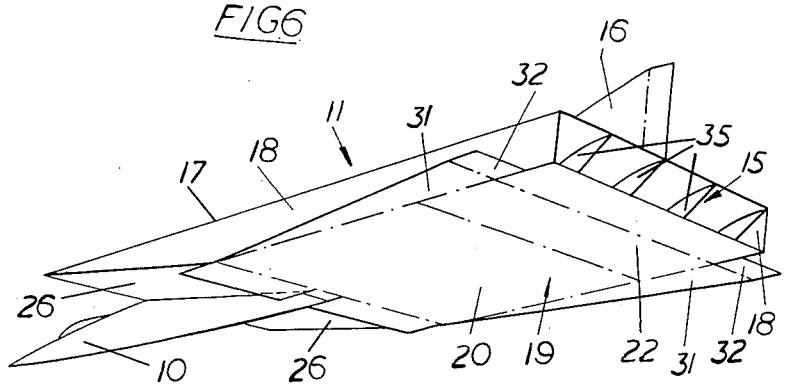
Figure 7:
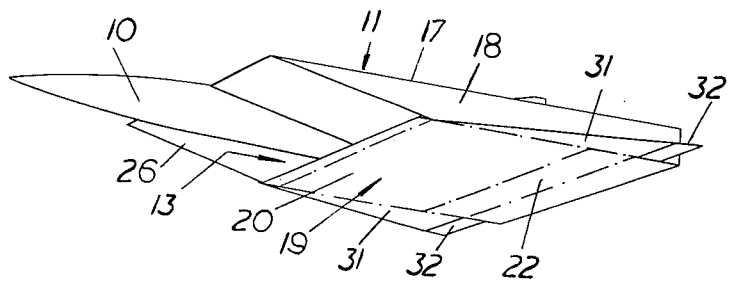
Figure 8:
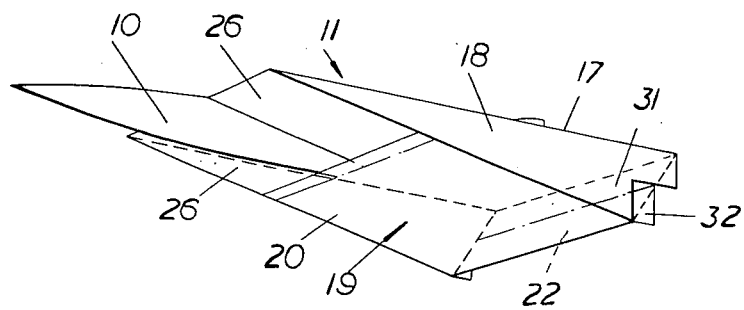
Figure 9:
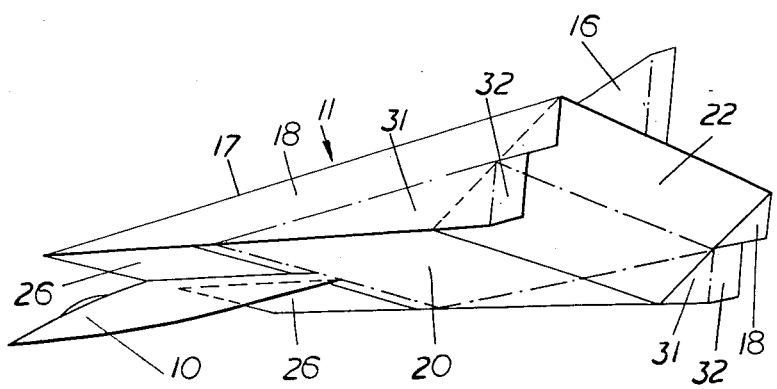

One embodiment of the present invention will now be described with reference to the schematic drawings accompanying the provisional specification in which:

FIGURE 1 is a longitudinal section through an aircraft embodying the present invention, the parts being shown in a position suitable for subsonic and low Mach number flight conditions, FIGURE 2 is a front elevation of the aircraft shown in FIGURE 1, FIGURE 3 is a section similar to that shown in FIGURE 1 with the parts shown in a position suitable for High Mach number flight conditions, FIGURE 4 is a front elevation of the aircraft shown in FIGURE 3, FIGURE 5 is a perspective view of the aircraft looking towards the front of the aircraft with the parts shown in a position suitable for low subsonic flight conditions, FIGURE 6 is a perspective view of the aircraft shown in FIGURE 5 looking towards the rear of the aircraft, FIGURE 7 is a perspective view similar to FIGURE 5 with the parts shown in a position suitable for low supersonic flight conditons, FIGURE 8 is a perspective view similar to FIGURE 5 with the parts shown in a position suitable for high Mach number flight conditions, and FIGURE 9 is a perspective view of the aircraft shown in FIGURE 8 looking towards the rear of the aircraft.

The aircraft comprises a fuselage portion 10 which extends forwardly of a portion 11 which produces aerodynamic lift forces on the aircraft and whose configuration can be altered as hereafter described. Mounted within the flight sustaining body portion 11 are four forward propulsion engines 12, of which only one is shown. Each forward propulsion engine 12 receives air from a forwardly facing air intake which is rectangular in cross-section and exhausts to a rearwardly extending jet pipe 14 which at its downstream end terminates in a rectangular propulsion nozzle 15. Mounted at the rear end of the portion 11 is a fin 16.

The portion 11 comprises an upper wall 17, side walls 18 and a lower wall 19. The lower wall 19 is formed by an upstream wall portion 20 which is pivoted at 21 to a pivot which is slidable rearwardly of the aircraft, and a downstream wall portion 22 which is hinged at 23 to the downstream end of the wall portion 20. The wall portion 22 is pivoted at 23' in the region of its mid-length.

The upstream wall portion 20 forms the lower wall of rectangular air intakes 13, the side walls of the air intakes 13 being formed by a portion of a side wall 18 and by a wall 24. Each engine 12 is mounted internally of the portion 11 towards the rear of a respective air intake 13 in any suitable manner. For example, the engine 12 may be mounted by trunnions (not shown) carried by the upper wall 17 and/or the side walls 24 and 28 in the case of outboard engines, and on the other hand by trunnions mounted on the upper wall 17 and the side walls 24 and the fuselage 10 in the case of inboard engines. Each air intake 13 also comprises an upper wall 25 which is formed by a flat upstream wall member 26 and a flat downstream wall member 27 which are hinged together at 28. The upstream end of the wall member 26 is pivoted at 29 to the upper wall 17 of the portion 11 and the downstream end of the wall member 27 is slidably mounted at 30.

Wing portions 31 having flaps 32 are hinged to the side walls 18 at 33 and under certain flight speeds form a continuation of the lower wall 19.

The downstream wall portion 22 forms the lower wall of the rectangular propulsion nozzle 15 whose upper wall 34 is convergent/divergent. The propulsion nozzle 15 is provided with dividing walls 35.

When the aircraft is operating at low flight speeds the flat wall members 26 and 27 are in the position shown in dotted line FIGURE 1 and full line in FIGURES 5 and 6. In this position the cross-sectional area of each air intake 13 is large to allow sufficient mass flow of low velocity air to the forward propulsion engines 12. As the forward speed of the aircraft increases the flat wall members 26 and 27 are moved, by any suitable means, further towards the wall portion 20 against the ram force of relatively moving air until the members 26 and 27 are moved to their final position shown in the full line position of FIGURE 1 and FIGURE 7. When in this position the parts form a supersonic air intake which is capable of operation up to Mach numbers of say Mach 5. The movement of the flat wall members may be accomplished by suitable mechanism actuated by the pilot or may be automatically accomplished by control means automatically actuated upon changes of pressure sensed by a conventional free stream Pitot head (not shown). For example, the Pitot head can be utilized to generate a signal in accordance with the speed of the aircraft, the signal being used to control the suitable actuating mechanisms (not shown) for moving the wall members 26 and 27 to vary the cross-sectional area of the air intakes 13 to suit the particular speed of the aircraft. Any suitable actuating mechanisms may be used, for example, variable speed air motors, operating screw jacks disposed between the upper wall 17 and the pivot 28.

When the forward speed of the aircraft rises to very high Mach numbers, say above Mach 5, the engines 12 are shut off, and the wall portion 20 is moved about the pivot 21 to close off the air intakes 13. The movement of the wall portion 20 is under the control of the pilot of the aircraft and may be accomplished through a conventional drive or actuating mechanism (not shown); for example, a power means such as an air or electric motor which is arranged to actuate a quadrant gear attached to the wall portion 20 co-axial of its pivot 21. When the wall portion 20 reaches the position in which it closes the intakes 13 it forms a continuation of the flat wall member 26, as shown in FIGURES 3, 8 and 9, and it also moves the downstream wall portion 22 about the pivot 24 to a position in which it closes off the propulsion nozzle 15. As will be clearly seen in FIGURES 3, 8 and 9 when the wall members 26, 20 and 22 are in this position they form with the upper wall 17 a wedge-shape configuration, the wall 22 forming the flat downstream end of the wedge. The wing portions 31 are moved about the hinges 33 to form a continuation of the side walls 18 and complete the side walls of the wedge. Movement of the wing portions 31 about their hinges 33 may be accomplished by any suitable actuating mechanism or linkage controllable by the pilot.

When the parts are in this position fuel, such as hydrogen, is ejected from nozzles 36 and the fuel is drawn into the area immediately downstream of the wall 22 and is burned with atmospheric air in this area. Nozzles 36 may be orifices in the wall position 20 or may be formed as a single transverse slot across a medial portion of the wall portion 20. The upstream position of the nozzles 36 as shown in the drawings is determined by the burning and mixing characteristics of the fuel to be used at the required speed and altitude. The burning of the fuel increases the pressure in the area immediately downstream of the wall 22 and produces a forward thrust on the aircraft. The hydrogen, could, for example, be stored under high pressure in gas cylinders and controlled by valves (not shown).

At very high Mach numbers, for example above Mach 5, the atmospheric air temperature in the region downstream of the wall 22 may be in the region of 1,000° C. and will automatically ignite the fuel.

It will be appreciated that the present invention provides an aircraft which is capable of low flight speeds and is also capable of very high forward speeds in excess of, say, Mach 5. Such an aircraft would be capable of putting a satellite into orbit around the earth.

The forward propulsion engines 12 may be gas turbine engines, rocket motors, ram-jet engines or turbo-ramjet engines of the type disclosed and claimed in co-pending United States patent application Serial No. 328,659.

What I claim is:

1. An aircraft capable of flight in a range of subsonic and supersonic speeds comprising a flight sustaining body portion having a changeable form in at least longitudinal section from a first configuration for producing aerodynamic lift forces on the aircraft at low speeds to a second configuration for high speeds which is generally wedge-shape in longitudinal section of the body portion and is defined by rearwardly diverging walls separated at the downstream end thereof by a rearwardly facing wall; at least one forward propulsion engine for operating the aircraft at low speeds when said body portion is in said first configuration, said forward propulsion engine having an air intake and a propulsion nozzle both of which are closeable at high speeds of the aircraft when said body portion is in said second wedge-shaped configuration; and means to supply a fuel for burning with the atmosphere in the proximity of the external surface of the rearwardly facing wall of said second configuration of said body portion so as to produce a forward thrust on said rearwardly facing wall.

2. An aircraft as claimed in claim 1 in which the air intake of said forward propulsion engine includes an adjustable wall portion for varying the cross-sectional area of the intake to suit subsonic and supersonic speeds of the aircraft when said body portion is in said first configuration.

3. An aircraft as claimed in claim 2 in which said air intake is rectangular in cross-section and in which the adjustable wall portion of said intake is an upper wall of the intake, said nozzle having a rectangular cross-section with at least a lower wall portion thereof adjustable to vary the cross-sectional area of the same.

4. An aircraft as claimed in claim 1 in which said air take is rectangular in cross-section and includes a flat upper wall member pivoted adjacent its upstream end for varying the cross-sectional area of the intake to suit subsonic and supersonic speeds when said body portion is in said first configuration, said air intake having a lower wall member forming a part of said flight sustaining body portion and pivoted in the region of its upstream end, said lower wall member being pivoted to a position to form a continuation of said upper wall portion and close said air intake when said upper wall portion has first been moved to a position reducing the area of the air intake and said body portion is in its second configuration.

5. An aircraft as claimed in claim 1 in which said flight sustaining body portion is provided with wing portions pivoted to the longitudinal extremities thereof, said wing portions being pivotable between an aerodynamic lift producing position when said body portion is in said first configuration to a second position forming part of the longitudinal terminal end sections of said body portion when said body portion is in its second wedge-shaped configuration.

6. An aircraft as claimed in claim 1 in which said fuel for burning with the atmosphere is a self-ignitable fuel.

7. An aircraft as claimed in claim 6 in which said self-ignitable fuel is hydrogen.

8. An aircraft as claimed in claim 1 in which said means to supply a fuel for burning with the atmosphere includes nozzle means positioned in the proximity of the downstream end of the lower divergent wall of said second wedge-shaped configuration.

9. An aircraft capable of flight in a range of subsonic and supersonic speeds comprising a flight sustaining body portion having a changeable form in at least longitudinal section from a first configuration for producing aerodynamic lift forces on the aircraft at low speeds to a second configuration for high speeds which is generally wedge-shaped in longitudinal section of the body portion, said flight sustaining body portion including an upper fixed wall, a lower sectional wall spaced from said upper fixed wall and longitudinally extending side walls; said lower sectional wall including an upstream wall portion hingedly connected to a downstream wall portion, said upstream wall portion being pivoted to a longitudinally slidable pivot adjacent its upstream end and said downstream wall portion being pivoted intermediate its length, said lower sectional wall being arranged to define the lower surface of said body portion when in said first configuration and a rearwardly diverging wall with respect to said upper fixed wall and a rearwardly facing wall between the downstream end of the upstream wall portion and the downstream end of the upper wall when said body portion is in said second wedge-shaped configuration; at least one forward propulsion engine internally mounted of said body portion for operating the aircraft at low speeds when said body portion is in said first configuration, said forward propulsion engine having an air intake and a propulsion nozzle both of which are closable at high speeds of the aircraft when said body portion is in said second wedge-shaped configuration; and means to supply a full for burning with the atmosphere in the proximity of the external surface of the rearwardly facing wall where said body portion is in said second wedge-shaped configuration so as to produce forward thrust on said rearwardly facing wall.

10. An aircraft as claimed in claim 9 in which said air intake includes an upper flat wall member pivoted adjacent its upstream end, said upper flat wall member being formed in an upstream section and a downstream section, the sections being hinged together and the downstream section being pivotally and slidably mounted at its downstream end, said upstream section of said flat wall member forming a continuation of the upstream wall portion of said lower sectional wall of said body portion when the body portion is in said second configuration and said downstream section of said flat wall member diverging in a downstream direction.

11. An aircraft as claimed in claim 10 in which said upper flat wall member of said air intake is movable to vary said air intake when said flight sustaining body portion is in its first configuration.

12. An aircraft as claimed in claim 9 including wing portions pivoted to said side walls of said body portion, said wing portions being movable from a first position in which they provide a continuation of said lower sectional wall to a second position in which they provide a continuation of said side walls.

13. An aircraft as claimed in claim 9 in which said means to supply a fuel for burning with the atmosphere includes nozzle means positioned on the downstream end of the upstream wall portion of said lower sectional wall, said nozzle means being arranged to supply fuel in the proximity of the external surface of said rearwardly facing wall when said flight sustaining body portion is in said second wedge-shaped configuration.

14. An aircraft as claimed in claim 13 in which said fuel discharged by said nozzle means is a self-ignitable fuel.

15. An aircraft as claimed in claim 14 in which said self-ignitable fuel is hydrogen.

References Cited by the Examiner

UNITED STATES PATENTS

| 1,725,914 | 8/29 | Hallowell | 244—74 |
| 2,681,773 | 6/54 | Rethorst | 244—36 X |
| 2,973,921 | 3/61 | Price | 244—36 X |
| 2,995,317 | 8/61 | Schoppe | 244—53 X |

OTHER REFERENCES

Aviation Week, April 20, 1959, pages 94, 95, 97, 98.

FERGUS S. MIDDLETON, *Primary Examiner.*

MILTON BUCHLER, *Examiner.*